United States Patent
Chen

[11] Patent Number: 5,958,232
[45] Date of Patent: Sep. 28, 1999

[54] REVERSE OSMOSIS DRINKING WATER TREATMENT SYSTEM WITH BACKWASHABLE PRECISE PREFILTER UNIT

[76] Inventor: Kai Rui Chen, No.27, Building 5, Nan Qi Xiang, Gong Qing Tuan Xi Ru, Zhang Dian District, Zi Bo, Shan Dong, China, Province 255000

[21] Appl. No.: 08/871,970

[22] Filed: Jun. 10, 1997

[30] Foreign Application Priority Data

Dec. 27, 1996 [CN] China ................................ 96223167

[51] Int. Cl.⁶ .............................................. B01D 63/00
[52] U.S. Cl. .................... 210/257.2; 210/660; 210/663; 210/282; 210/87; 210/670; 210/333.01
[58] Field of Search .............................. 210/257.2, 195.2, 210/652, 660, 663, 282, 636, 87, 670, 232, 333.01, 134

[56] References Cited

U.S. PATENT DOCUMENTS

| | | | |
|---|---|---|---|
| 4,317,721 | 3/1982 | Pynnönen | 210/136 |
| 4,342,651 | 8/1982 | Ahrens | 210/636 |
| 5,094,742 | 3/1992 | Miller et al. | 210/232 |
| 5,281,338 | 1/1994 | Harris | 210/670 |
| 5,510,027 | 4/1996 | Tejada | 201/282 |
| 5,632,892 | 5/1997 | Klein | 210/257.2 |

OTHER PUBLICATIONS

Han Book of Industrial Membranes p. 529, Fig. 4, 1st. Ed.

*Primary Examiner*—Ana Fortuna
*Attorney, Agent, or Firm*—Smith, Gambrell & Russell, LLP; Beveridge, DeGrandi, Weilacher & Young Intellectual Property Group

[57] ABSTRACT

A reverse osmosis drinking water treatment system with a backwashable precise prefilter unit includes a super precise filter, a pressure pump and its automatic control system, a reverse osmosis membrane (or a nano-filtration membrane), a pressure tank, a post filter, and a drinking water dispensing apparatus. In front of the super precise filter, there is an independent backwashable precise prefilter unit. This unit is composed of three filter columns: the first packed with quartz sand, the second with a Cu—Zn alloy of high purity, and the third with sintered microporous PE. A five channel ball valve connects the water supply with the backwashable precise prefilter unit, and then with the super precise filter. The five channel ball valve has three different working positions, namely, a cleaning water position, a discharging water position, and a backwashing position. The useful life of this backwashable precise prefilter unit can be more than three years.

5 Claims, 5 Drawing Sheets

REVERSE OSMOSIS DRINKING WATER TREATMENT SYSTEM WITH BACKWASHABLE PRECISE PREFILTER UNIT

BACKGROUND OF THE INVENTION

1. Field of the Invention

This invention relates to a reverse osmosis water treatment system, more particularly, it relates to a reverse osmosis drinking water treatment system with a backwashable precise prefilter unit. This reverse osmosis drinking water treatment system with a backwashable precise prefilter unit includes a super precise filter, a pressure pump, a reverse osmosis membrane (or nano-filtration membrane) assembly, a pressure tank, a post filter, a drinking water dispensing apparatus, and a backwashable precise prefilter unit.

2. Background Information

Reverse osmosis membranes (or nano-filtration membranes) have very fine pores and a very thin size, and therefore, the membranes are easily dirtied by suspended particles in the incoming water, and they are also susceptible to being attacked or destroyed by bacteria and active chlorine. In order to ensure the membrane's usefulness under ordinary conditions for a long working life, it is necessary to pretreat or prefilter the incoming water. Nowadays, in the market, all reverse osmosis drinking water treatment systems include several filtration steps in series, using either medium types or small types of filters. Usually, these prefilters are composed of precise filters with 1–2 grade cotton or polymer fibers and filters with 1–2 grade active carbon, connected in series. Due to the fact that such filters have no backwashable ability, these prefilter systems with traditional designs must be carefully used to maintain their effectiveness. In tap water, sand, rust, and colloid particles etc. are present; all such dirty particles can accumulate on the precise filter core, and finally its water penetration ability gradually decreases, and eventually, these filters will be destroyed. Secondly, the active carbon can be consumed quickly due to the high content of chlorine in water. The surface adsorption can be gradually saturated, and bacteria in the active carbon can easily grow. In this manner, if the prefilter core can not be replaced frequently, the ordinary working process of the reverse osmosis membrane will be directly destroyed, and the useful life thereof greatly shortened. Usually, every half a year, the core of the prefilter should be replaced. If the tap water has high turbidity, or if high amounts of chlorine exist, the filter core replacement period should be shortened. This means that the customers must pay more for maintenance and also will have more trouble during use.

SUMMARY OF THE INVENTION

Now, people pay much more attention to their health and life. Therefore, they widely use drinking water treatment systems, both in domestic use and in other locations, in order to get high quality drinking water. But for current drinking water treatment systems, it is necessary to replace the filter core frequently. If one does not, the water will again become dirty, and this will influence the ordinary working process and the useful life of the water treatment system.

The object of this invention is to provide a reverse osmosis drinking water treatment system, with a backwashable precise prefilter unit.

A further object of this invention is to provide a reverse osmosis drinking water treatment system with a backwashable precise prefilter unit, the backwashable precise prefilter unit being composed of a backwashable prefilter column installation and a transfer valve.

A further object of this invention is to provide a reverse osmosis drinking water treatment system with a backwashable precise prefilter unit, wherein the transfer valve is a five channel ball valve. This ball valve can be put in three different working positions, specifically, a cleaning water position, a discharging water position, and a backwashing position.

A further object of this invention is to provide a reverse osmosis drinking water treatment system with a backwashable precise prefilter unit, wherein the backwashable prefilter column installation has a long useful life and high efficiency, and it is made with filtering materials that have the ability to recover to their original state after the backwashing process.

A further object of this invention is to provide a reverse osmosis drinking water treatment system with a backwashable precise prefilter unit for domestic and group applications. Furthermore, using the system of the invention, the prefilter unit need not be replaced, and the water fed into the reverse osmosis membrane is of sufficient purity to be treated by the membrane. In this manner, the problem that the customers need to frequently replace the filter core can be eliminated. The useful life of the system can be lengthened, and the quality of the drinking water can be ensured.

In order to realize the objects mentioned above, this invention includes the following features: a reverse osmosis drinking water treatment system with a backwashable precise prefilter unit includes a super precise filter, a pressure pump, a reverse osmosis membrane (or nano-filtration membrane) assembly, a pressure tank, a post filter, a drinking water dispensing apparatus, etc. Its characteristics lie in that it has an independent backwashable precise prefilter unit, which is put in front of the super precise filter. The backwashable precise prefilter unit is composed of a backwashable prefilter column installation and a transfer valve. The transfer valve is a five channel ball valve. The ball valve can be controlled by a handle, such that the precise prefilter unit can have three positions: a cleaning water position, a discharging water position, and a backwashing position, with three water flow channels arranged in the different directions, respectively. The backwashable prefilter column installation is composed of three filter columns in series, each column containing different filtering materials. In the first filter column, 0.5 mm quartz sand is packed; in the second filter column, high purity granular copper-zinc alloy is packed; and in the third filter column, sintered microporous PE is packed with 3 $\mu$m filtration ability.

After being treated with the above-mentioned precise prefilter unit, the water passes through a super precise filter with 0.5 $\mu$m filtration ability (it is also a type of super precise sintered microporous PE). In this manner, the reverse osmosis membrane assembly can be much better than traditionally designed reverse osmosis drinking water treatment systems. Additionally, in this system, the reverse osmosis membrane has a longer useful life.

This invention has obvious benefits in comparison with techniques currently used: depending on the water flow amount of the drinking water treatment system and the quality of the tap water, customers can backwash the precise prefilter unit two times every week and 5–10 minutes every time. In this manner, all the dirty materials accumulated on the filters can be discharged through the discharging channel in the opposite direction, and then all the filter materials are returned to their original quality state. Therefore, it can be ensured that the water quality entering the reverse osmosis filter membrane assembly is stable, and also that the final pure water, flowing out of the drinking water treatment system, is stable.

The backwashable prefilter column installation can work more than three years, and the reverse osmosis membrane can also have its useful life lengthened. This not only decreases the cost for maintenance, but it also eliminates the trouble of frequent replacement of filter materials, while ensuring the drinking water quality.

DETAILED DESCRIPTION OF THE PREFERRED EMBODIMENT

Figure 1:
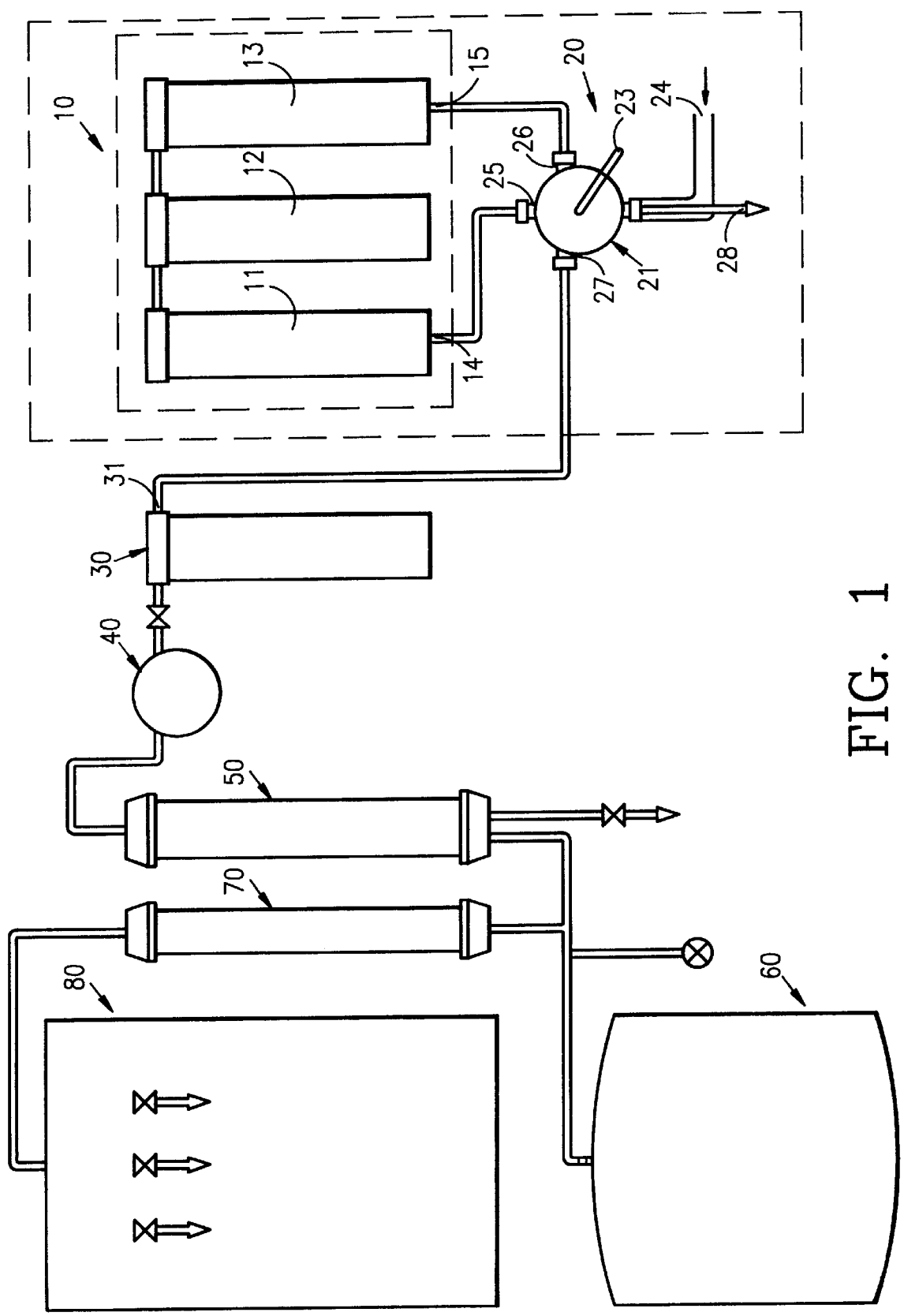
FIG. 1 is the structure of this invention.
Figure 3:
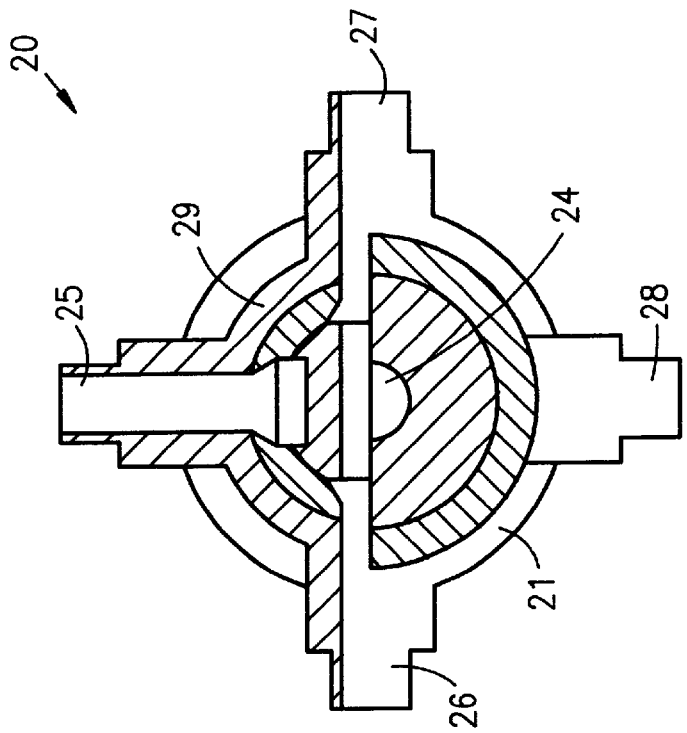
FIG. 3 is the section structure of a ball valve used in this invention.
Figure 2:
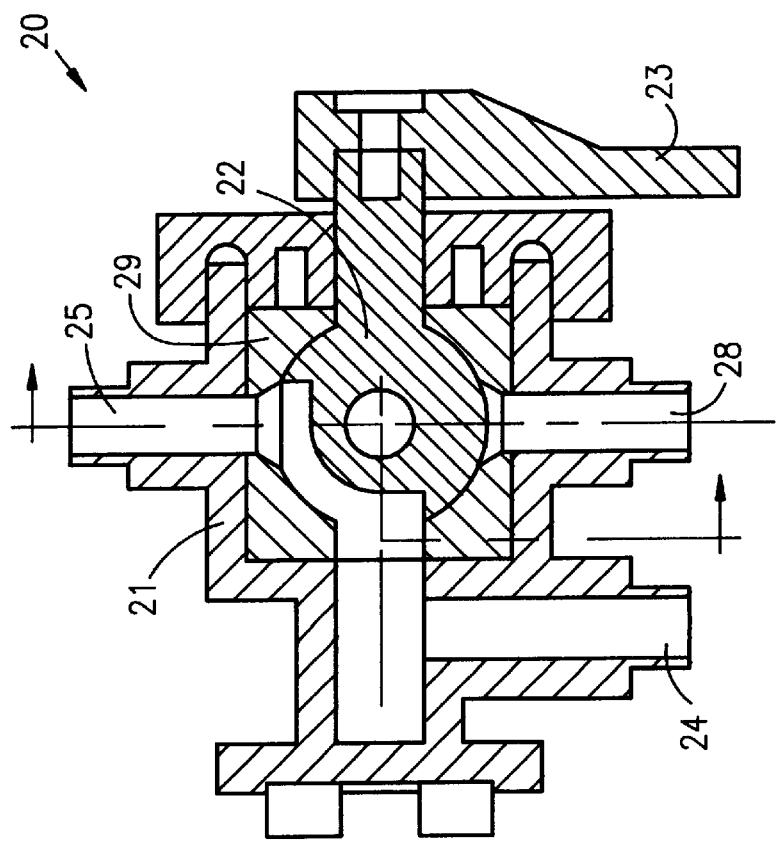
FIG. 2 is the rotational section structure of a ball valve used in this invention.

Referring to FIG. 1 to FIG. 6, this reverse osmosis drinking water treatment system with a backwashable precise prefilter unit is composed of a super precise filter 30, a pressure pump 40 and its automatic control system, a reverse osmosis membrane 50 (or nano-filtration membrane), a pressure tank 60, a post filter 70, a drinking water dispensing apparatus 80, a backwashing prefilter column installation 10, and a five channel ball valve 20. The five channel ball valve 20 is composed of valve body 21, a circular ball valve 22 in the valve body 21, and handle 23. The handle 23 is connected to the circular ball valve 22. In the valve body 21, there are original water inlet 24, original water outlet 25, filtered water inlet 26, filtered water outlet 27, and discharging channel 28. On the circular valve 22, there are original water channel 221 and connecting channel 222. In order to seal the space between the circular ball valve 22 and the valve body 21, it is necessary to put water sealing disk 29 on the outside surface of the circular ball valve 22.

Figure 4:
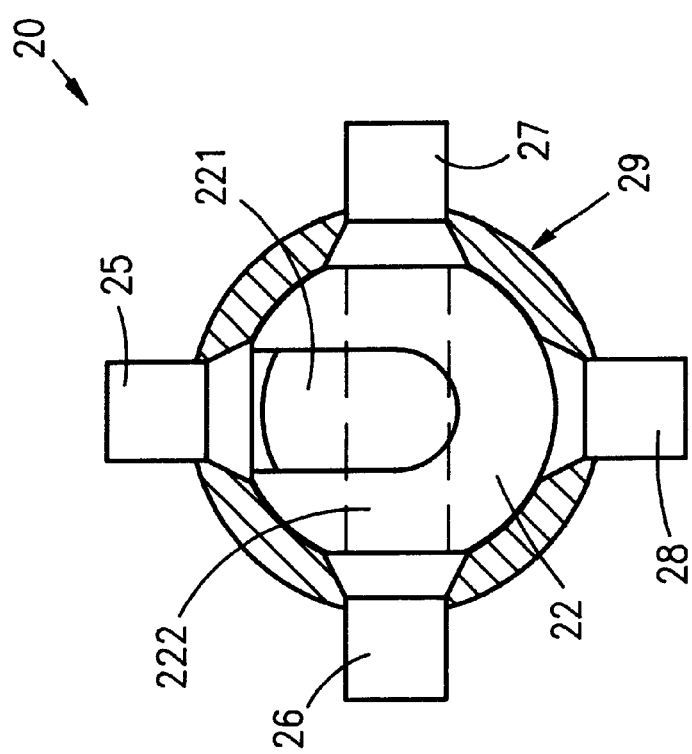
FIG. 4 is the structure of the ball valve at the cleaning water position.

The handle 23 can be used to place the circular ball valve 22 in three positions, namely, a cleaning water position, a discharging water position, and a backwashing position. As shown in FIG. 4, the circular ball valve 22 is in the cleaning water position. Here, the tap water passes through original water inlet 24→original water outlet 25→backwashing prefilter column installation 10→filtered water inlet 26→filtered water outlet 27→and super precise filter 30.

Figure 5:
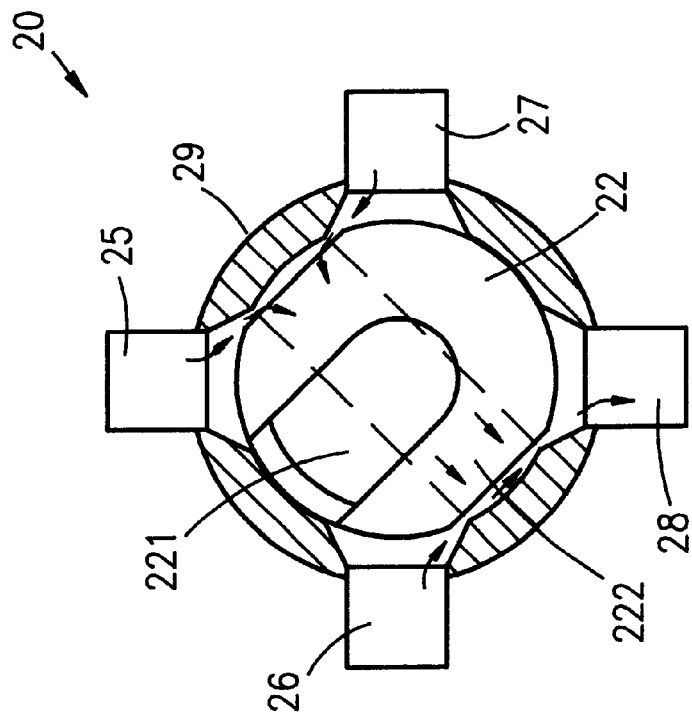
FIG. 5 is the structure of the ball valve at the discharging water position.

From the position of FIG. 4, by rotating the handle 23, as shown in FIG. 5, the circular ball valve 22 is put in the discharging water position. In this position, original water outlet 25, filtered water inlet 26, and filtered water outlet 27 are connected with discharging channel 28, and dirty water can be discharged out of the inner body of the valve 20.

Figure 6:
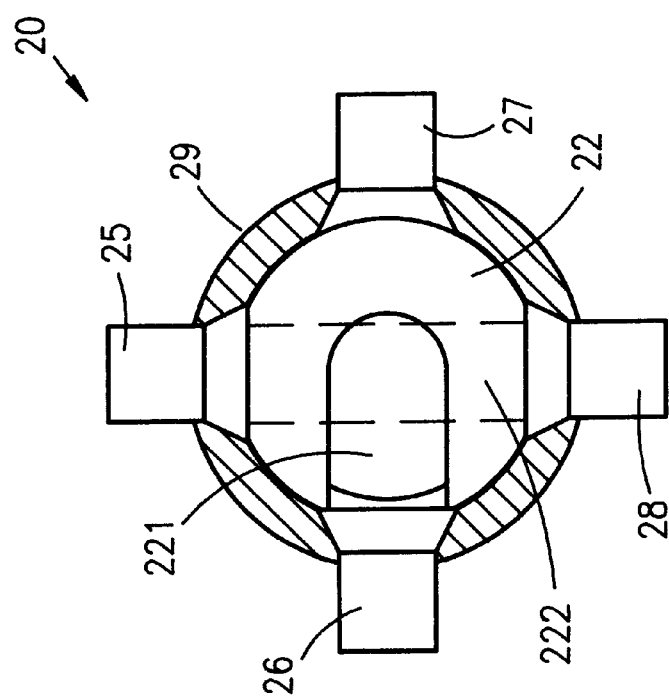
FIG. 6 is the structure of the ball valve at the backwashing position.

From the position of FIG. 4, by rotating the handle 90°, as shown in FIG. 6, the circular ball valve 22 is put in the backwashing position, and in this position, tap water passes through original water inlet 24→filtered water inlet 26→backwashing prefilter filter column installation 10→original water outlet 25→and discharging channel 28. In this manner, backwashing can be realized by the backwashing prefilter columns.

Figure 7:
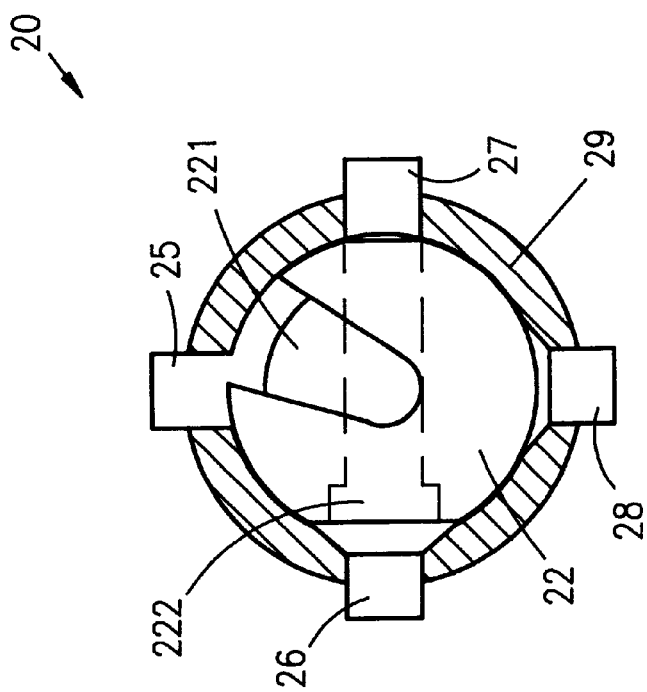
FIG. 7 is another structure of a ball valve at the cleaning water position.
Figure 9:
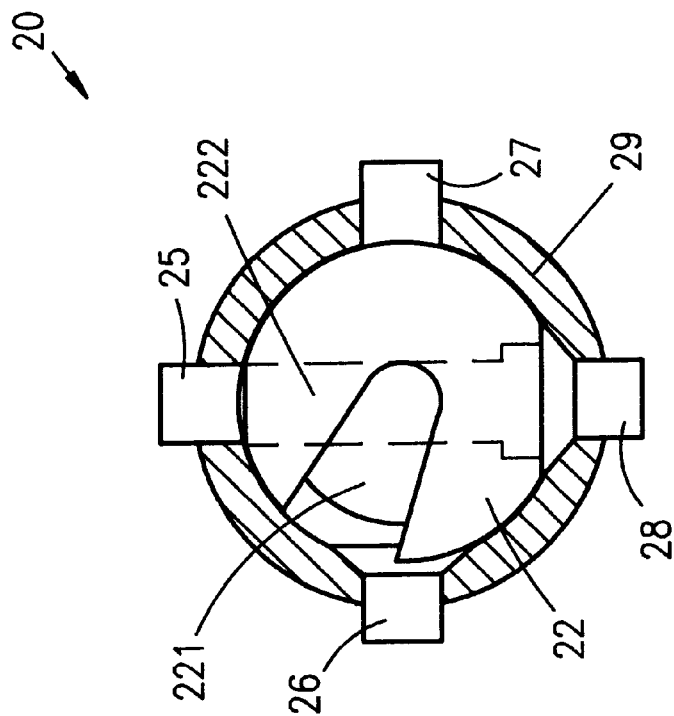
FIG. 9 is another structure of a ball valve at the backwashing position.
Figure 8:
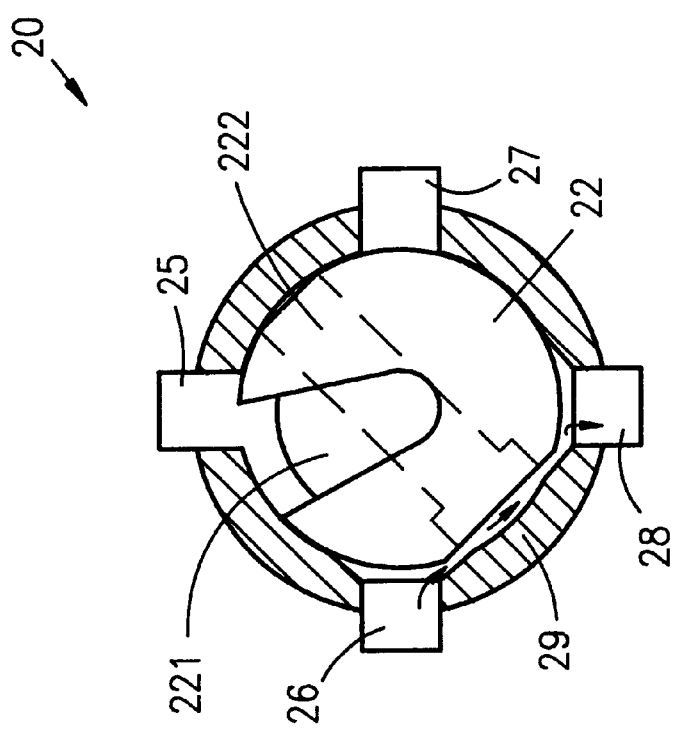
FIG. 8 is another structure of a ball valve at the discharging water position.

When the tap water is very dirty, in order to avoid the situation where dirty material from the inlet water may oppositely suck the prefilter column after concentration during the backwashing process, this invention includes a five channel ball valve 20 with another structure, as shown in FIG. 7 to FIG. 9. In FIG. 7, the five channel ball valve 20 is situated in the cleaning water position, while in FIG. 9, it is situated in the backwashing position. The water flow directions of these two positions are the same as the directions shown in FIG. 4 and FIG. 6, respectively. Additionally, as shown in FIG. 8, the circular ball valve 22 of this embodiment is in the discharging water position. At this position, tap water passes through original water inlet 24→original water outlet 25→backwashing prefilter column installation 10→filtered water inlet 26→discharging channel 28, and then out of the system. In this manner, all the dirty material, concentrated after backwashing and remaining in the filter column, can be entirely discharged out.

The backwashing prefilter column installation 10 is connected to the front stage of the super precise filter 30 through the five channel ball valve 20. The backwashing prefilter column installation 10 is composed of filter column 11, filter column 12, and filter column 13, connected in series. The water inlet 14 of filter column 11 is connected with the original water outlet 25 of the five channel ball valve 20; the outlet 15 of filter column 13 is connected with filtered water inlet 26 of the five channel ball valve 20; and the filtered water outlet 27 of five channel ball valve 20 is connected with the water inlet 31 of the super precise filter 30. In filter column 11, quartz sand is packed having a particle size of 0.5 mm; in filter column 12, high purity granular copper-zinc alloy is packed; and in filter column 13, sintered microporous PE is packed with a filtration ability of 3 μm.

As we know, quartz sand is the filtration medium with the longest life. It can filter out the mud sand, iron rust, colloid particles, and other large particles (10–100 μm.). By means of backwashing, it is easy to discharge these dirty particles out in the opposite direction.

By means of oxidation and reduction processes, granular pure Cu—Zn alloy can be used to eliminate excessive chlorine and heavy metal ions in the inlet water. Additionally, this alloy has the ability to eliminate bacteria and alga, and also to reduce the hardness of the water. During backwashing, iron oxides and copper sulfide deposited on the alloy surface can be discharged out. In this manner, the water purification ability can be recovered to its initial level, and the useful life can be over 10 years.

Sintered microporous PE is a precise filtration medium with a rigid, honeycomb, tertiary structure. It can be used to filter out fine dirty materials, and the output water has an SDI less than 5. The sintered microporous PE material has excellent chemical properties, is odorless and nontoxic, and its filtration ability can be recovered instantaneously after backwashing. Its useful life can be over 5 years.

Furthermore, in order to let the customers have more convenience, during the design of this apparatus, the backwashable precise prefilter unit can be separated from the traditional mono-structure drinking water treatment system. It can be designed as a single, nice, small, and thin type of structure, which is able to be placed on the wall over the tap. In this form, it can be placed near the tap water outlet, and therefore, the user can easily accomplish the backwashing function by rotating the handle 1–2 times a week. Due to the fact that the prefilter unit is separate from the drinking water treatment system, small and thin types can be easily obtained, and this apparatus can be put under the sink.

What is claimed is:

1. A reverse osmosis drinking water treatment system with a backwashable precise prefilter unit, comprising:
    a super precise filter,
    a pressure pump for moving water in the system, wherein the pressure pump includes an automatic control system,
    a reverse osmosis membrane or a nano-filtration membrane operatively connected with an outlet of the super precise filter such that water passes through the super precise filter and then through the membrane,
    a pressure tank to maintain the system under pressure,
    a post filter operatively connected with an outlet of the membrane such that water passes through the membrane and then through the post filter,
    a drinking water dispensing apparatus operatively connected with an outlet of the post filter such that water passes through the post filter and then to the drinking water dispensing apparatus, and
    an independent backwasbable precise prefilter unit, operatively connected with an inlet of the super precise filter, wherein said backwashable precise prefilter unit contains a backwashable prefilter column installation and a transfer valve,
        wherein said backwashable prefilter column installation includes three filter columns in series, wherein each column is separately packed with long life and recoverable filter materials, and
        said transfer valve includes a five channel ball valve, wherein the five channel ball valve is switchable between the following working positions: a cleaning water position, a discharging water position, and a backwashing position.

2. The reverse osmosis drinking water treatment system with a backwashable precise prefilter unit of claim 1, wherein an inlet of a first filter column of the backwashable prefilter column installation is connected with an original water outlet of the five channel ball valve, and an outlet of a third filter column of the backwashable prefilter column installation is connected with a filtered water inlet of the five channel ball valve, and wherein a filtered water outlet of the five channel ball valve is connected with the inlet of the super precise filter.

3. The reverse osmosis drinking water treatment system with a backwashable precise prefilter unit of claim 1, wherein said five channel ball valve includes a valve body, a circular ball valve, and a handle,
    said circular ball valve being in the valve body and connected with the handle, wherein the ball valve can be placed in the different working positions by rotating the handle,
    said valve body having an original water inlet, an original water outlet, a filtered water inlet, a filtered water outlet, and a discharging channel, and
    said circular ball valve having an original water channel and a water flow channel.

4. The reverse osmosis drinking water treatment system with a backwashable precise prefilter unit of claim 1, wherein said three filter columns, which are connected in series, are packed with three different filter materials, wherein:
    a first column is packed with quartz sand for eliminating large granule dirty materials in the water and for reducing water turbidity,
    a second column is packed with granular Cu—Zn alloy for removing excessive chlorine and heavy metal ions by oxidation and reduction processes, and also for eliminating bacteria and alga and reducing hardness of the water, and
    a third column is packed with sintered microporous PE having a 3 $\mu$m filtration ability for removing fine dirty materials in the water,
    wherein said three filter materials have long useful lives and can recover their filtration ability after backwashing.

5. The reverse osmosis drinking water treatment system with a backwashable precise prefilter unit of claim 1, wherein the three filter columns of the backwashable prefilter column installation respectively include, as filter materials, quartz sand, granular Cu—Zn alloy, and sintered microporous PE.

* * * * *